United States Patent [19]

Gregory et al.

[11] Patent Number: 5,743,984
[45] Date of Patent: *Apr. 28, 1998

[54] METHODS OF CONSTRUCTING A PORTABLE LIQUID CONTAINMENT

[75] Inventors: David B. Gregory, Kawkawlin; Dan A. Oliver, West Branch, both of Mich.

[73] Assignee: ReNew Roof Technologies, Inc., Bay City, Mich.

[*] Notice: The term of this patent shall not extend beyond the expiration date of Pat. No. 5,567,259.

[21] Appl. No.: 619,315

[22] Filed: Mar. 21, 1996

Related U.S. Application Data

[63] Continuation-in-part of Ser. No. 421,197, Apr. 13, 1995, Pat. No. 5,567,259, which is a continuation-in-part of Ser. No. 247,137, May 20, 1994, Pat. No. 5,464,492.

[51] Int. Cl.⁶ .............................. B05D 5/00; B32B 31/00
[52] U.S. Cl. .................... 156/242; 156/292; 264/279; 264/309; 427/393.5
[58] Field of Search .................... 156/292, 246, 156/242; 4/488, 585; 184/106; 220/415, 417, 437, 439, 457, 461, 573, 627, 666, 678; 264/135, 136, 324, 309, 251, 257, 259, 271.1, 279, 279.1; 405/52; 134/123

[56] References Cited

U.S. PATENT DOCUMENTS

| | | | |
|---|---|---|---|
| 2,045,384 | 6/1936 | Gerb | 156/292 |
| 2,440,965 | 5/1948 | Merrill et al. | |
| 3,661,227 | 5/1972 | Robel et al. | 220/417 |
| 3,847,716 | 11/1974 | Dorsch | |
| 4,009,067 | 2/1977 | Rogers | 156/292 |
| 4,183,984 | 1/1980 | Browers et al. | |
| 4,245,055 | 1/1981 | Smith | |
| 4,247,586 | 1/1981 | Rochlin | 156/293 |
| 4,580,372 | 4/1986 | Osborn | |
| 4,671,024 | 6/1987 | Schumacher | 52/2 |
| 4,916,939 | 4/1990 | Mogel | |
| 5,090,588 | 2/1992 | VanRomer et al. | |
| 5,128,189 | 7/1992 | Bartlett | |
| 5,265,294 | 11/1993 | McClure et al. | |
| 5,423,339 | 6/1995 | Latimer | 134/123 |
| 5,462,655 | 10/1995 | Ladd et al. | 405/52 |
| 5,464,492 | 11/1995 | Gregory et al. | |
| 5,567,259 | 10/1996 | Gregory et al. | 156/242 |

OTHER PUBLICATIONS

Visuron Technologies ad and technical bulletin sheets; Polyarmor; 1990.

Primary Examiner—Richard Crispino
Attorney, Agent, or Firm—Learman & McCulloch

[57] ABSTRACT

A portable liquid containment has an endless containment wall surrounding a liquid containment area. To form the containment a top layer of elastomeric polymer compound is formed to the shape of the containment wall and containment area and is reinforced with woven fabric to provide a reinforced, liquid-impervious, seamless and foldless top membrane. A bottom layer of the same elastomeric polymer compound is applied to the inverted top layer and in curing unites with the underside of the top membrane while the top layer is inverted.

4 Claims, 8 Drawing Sheets

METHODS OF CONSTRUCTING A PORTABLE LIQUID CONTAINMENT

This application is a continuation-in-part of U.S. Ser. No. 08/421,197 filed Apr. 13, 1995, now U.S. Pat. No. 5,567,259, which is a continuation-in-part of U.S. Ser. No. 08/247,137, filed May 20, 1994, now U.S. Pat. No. 5,464,492.

This invention relates to liquid spill containment systems and particularly to a portable containment system and its method of manufacture and use.

BACKGROUND OF THE INVENTION

Non-portable liquid spill containment systems are known for use in tank farm environments, for example, in which a number of storage tanks containing environmentally hazardous liquids, such as petroleum fuel products, are accommodated within a spill containment area bounded by an upstanding perimetrical dike wall.

In one such known application, the dike wall is formed of packed earth or concrete and the wall and containment area are thereafter draped with a geo-textile woven fabric sheet over the top of which is sprayed a thermosetting cross-linked polymer material that cures to produce a seamless top skin or liner membrane for trapping any liquid product that should spill or leak from the tanks.

The particular top skin polymer material known to be used for this application is sold commercially under the trademark POLYARMOR, by Visuron Technologies, Inc. of Bay City, Mich. Containment systems of this type are permanent installations and thus would not be of practical use in applications where the location of the area to be contained is subject to change, such as at an airport where a mobile fueling truck transports and dispenses fuel to airplanes parked at any of a number of locations. In such situations, it is desirable to contain the area around the fueling vehicle and plane to trap any fuel that may spill during fuel transfer. The walls of such a portable unit need to be collapsible to permit a wheeled vehicle, such as the aforementioned fuel truck and/or plane to be driven or moved into and out of the confinement area over the confinement wall. The walls of the known permanent dike mentioned are not collapsible and hence do not permit the passage of wheeled vehicles thereover without potential damage.

SUMMARY OF THE INVENTION

The invention addresses the shortcomings of the prior stationary confinement systems by providing methods of constructing containment systems and containment systems that are portable and have containment walls that are elastically deformable. More particularly, a portable liquid spill containment constructed according to a first aspect of the invention includes a liquid-impervious base sheet to which is secured an upstanding, tubular containment wall formed of closed-cell foam that has an elastic memory enabling the wall to recover its original shape after each of repeated deformations, and which defines a liquid spill containment area interiorly within its boundary. Overlying the base sheet and containment wall is a continuous layer of liquid-impervious elastomeric polymer material that unites the base sheet and containment wall and provides a fluid-tight top skin membrane to contain fluid spills.

Because the spill containment is portable, it can be moved to those areas where liquid, which needs to be contained, is being handled. Once positioned, the closed-cell tubular containment wall permits one or more wheeled vehicles to be driven up over the wall into the containment area. The elastic memory of the closed-cell foam enables the wall to recover its original shape quickly and completely, after it has been deformed, and permits the unit to withstand repeated deformation/recovery cycles without any significant loss of performance.

The closed-cell structure of the foam resists liquid passage when the containment wall inevitably punctures and is exposed to liquid. Punctures or splits in the polymeric top skin are, however, easily repaired.

According to still another aspect of the invention, the portable containment system may be formed with a sump or recess provided within the confinement area at a lower level than the base sheet. Any spilled liquid is directed into the sump to localize and concentrate the liquid which may then be pumped out of the sump to another collection site. The sump thus simplifies the process of removing spilled liquid from the containment area and enables convenient, complete removal of the spilled liquid from the containment.

According to another aspect of the invention, a portable liquid spill containment comprises a liquid-impervious base layer with an endless containment wall fabricated of closed cell foam of the aforementioned type which encloses a spill containment area interiorally of the wall. A liquid-impervious, pliable top liner having a one-piece seamless construction lines the containment area and extends up and over the containment wall and is united to the base layer to encapsulate the containment wall. This containment has the same advantages and provides the same benefits as those discussed previously.

According to yet another aspect of the invention, a method of making a portable liquid spill containment is provided in which a sheet of pliable reinforcement fabric is laid over a form having an upstanding curb enclosing a recessed area, such that the sheet extends from the recessed area up and over the curb. A continuous top layer of curable liquid-impervious elastomeric polymer compound is applied in a flowable state to the exposed side of the fabric and permitted to cure, producing a seamless, liquid-impervious, reinforced membrane conforming generally to the shape of the form and including a channel impression formed by the curb that is open to the bottom side of the membrane. The membrane is removed from the form and a containment wall constructed from closed-cell foam is arranged in the open channel of the membrane after which a layer of the liquid-impervious elastomeric polymer compound is applied to the bottom side of the membrane and allowed to cure so as to close the channel and encapsulate the wall between the top and bottom elastomeric layers. This aspect of the invention provides an efficient, cost-effective method by which portable spill containments of the type described above may be produced.

Other objects and advantages of the invention will become apparent with reference to the accompanying drawings and the accompanying descriptive matter.

THE DRAWINGS

In the drawings.

and

DETAILED DESCRIPTION

Figure 1:
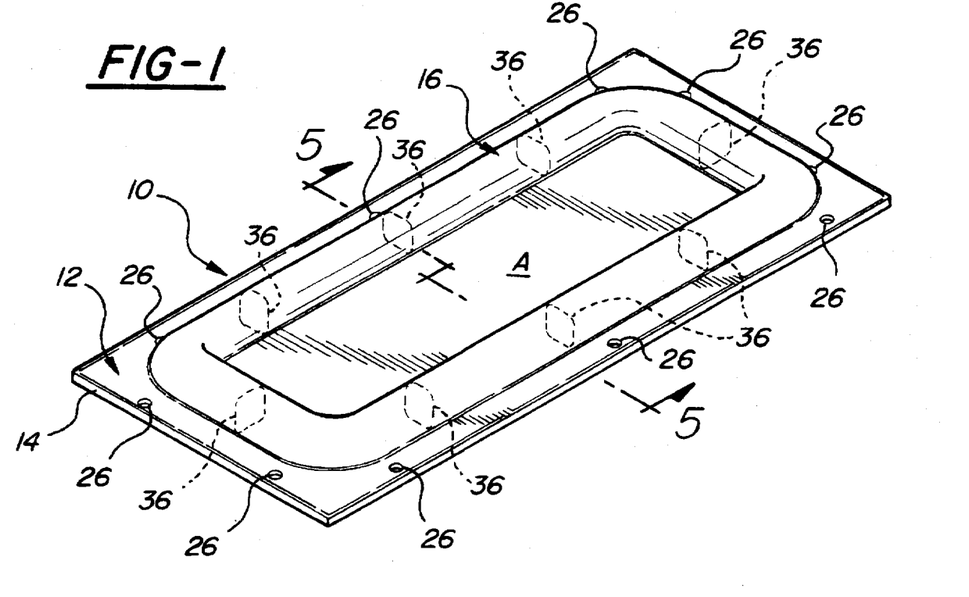
FIG. 1 is a perspective view of a liquid spill containment constructed according to the invention.

A portable liquid spill containment constructed in accordance with a first embodiment of the invention is indicated generally by the reference numeral 10 in the drawings and comprises a base sheet shown generally at 12 as having a perimetrical edge 14, inset from which is an upstanding, endless, tubular containment wall shown generally at 16 that isolates a containment area A within the confines of its interior boundary. The base sheet 12 has a base layer 18 formed of a liquid-impervious elastomeric polymer material that is resilient, tough, durable, abrasion-resistant, inert to chemicals such as petroleum products, exhibits good adhesion to reinforcement fabrics and closed-cell foams, is resistent to ultraviolet exposure and oxidation, and exhibits good low temperature flexibility. The preferred material of this type is the previously mentioned thermosetting crosslinked polymer compound sold commercially under the trade mark POLYARMOR, by Visuron Technologies, Inc. of Bay City, Mich. This material may be applied by preferably spraying, but possibly rolling, or brushing the material onto a transfer surface.

Figure 2:
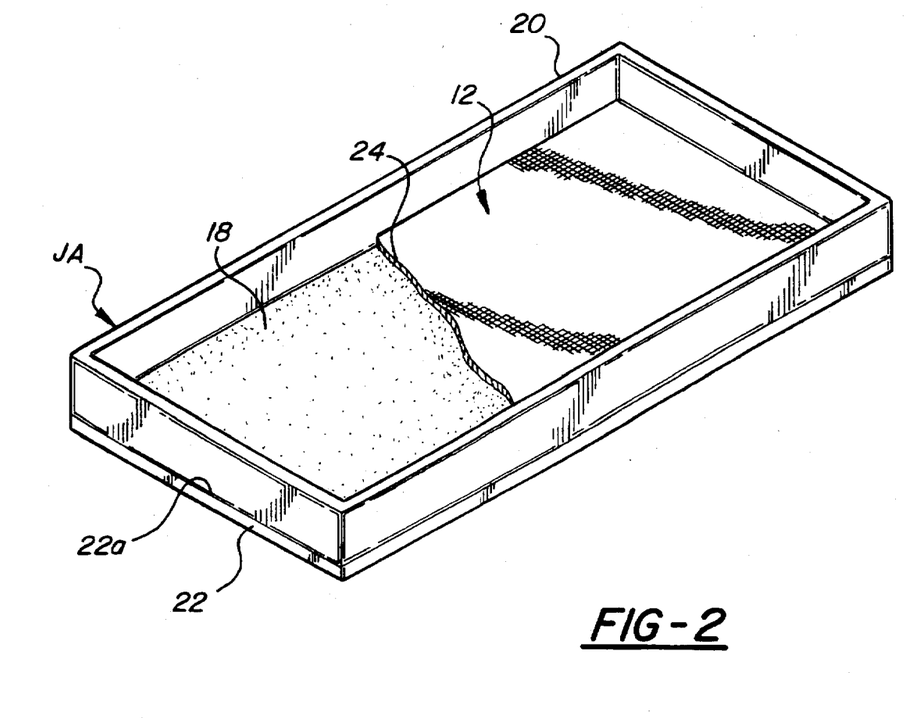
FIG. 2 is a perspective view of the jig assembly for forming the base layer of the containment surface showing the layer in the process of being formed.

FIG. 2 illustrates one method according to this invention for producing a base layer 12. An upstanding rigid jig assembly JA is provided which includes a jig frame 20 having an inner perimeter corresponding in dimensional size and shape to that of the base layer or sheet that is to be produced, for example, the frame 20 could be rectangular, as shown, and have an inner dimension of 25'×150' or whatever size is necessary to cover the area that is to be protected from fluid spills. The frame 20 is secured on a relatively larger flat support member 22 having an upper transfer surface 22a to which the base layer material will not adhere. One suitable support member 22 is a rigid laminated plastic sheet product (i.e. formica) that has been coated with wax. The same wax may be used to coat the interior surfaces of the frame 20.

Once the frame 20 has been positioned, the base layer material is applied, preferably by spraying it on the waxed transfer surface of the support member 22 within the confines of the frame 20 until the desired thickness of the base layer material is developed. A minimum base layer thickness of about 30 mils is required. The preferred base layer material cures in about 15 seconds. Once cured, the base layer 18 per se provides an elastomeric, fluid-impervious membrane that is semi-rigid with a Shore "D" hardness of about 30, a tensile strength of about 1,600 p.s.i., and an elongation factor in the neighborhood of six hundred percent.

Figure 3:
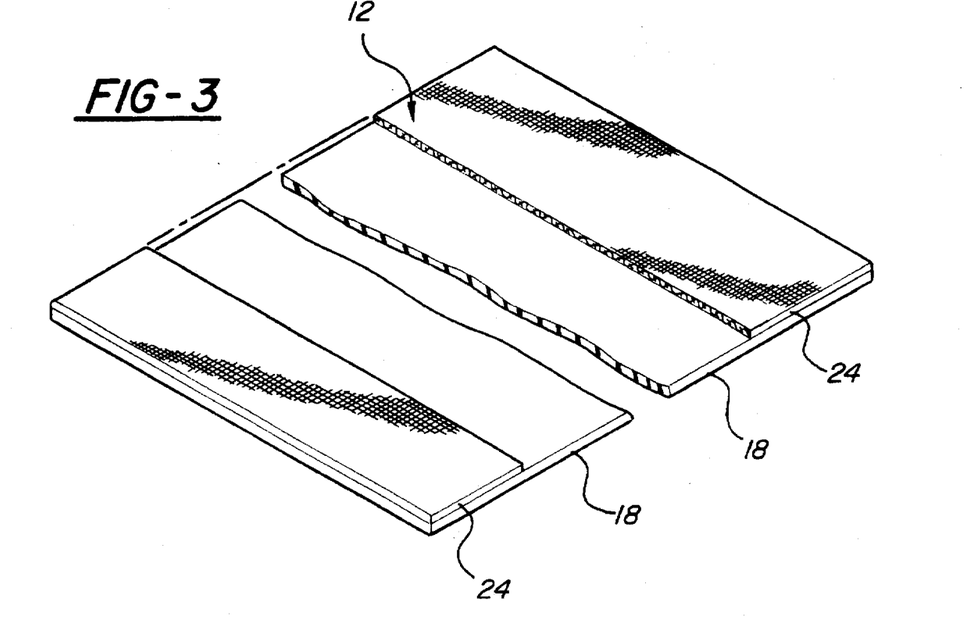
FIG. 3 is a fragmentary perspective view of the base layer so formed, shown partly broken away to illustrate its composite structure.

Before the base layer material cures, a web of woven fabric 24, or a non-woven, needle punched fabric, that has the same general dimensions as that of the base layer 18, may be placed on the base layer 18 so as to become adhered to the base layer as it cures to provide a composite structure. The fabric web 24 enhances the tensile strength and puncture resistance of the base sheet 12. Some of the types of fabric that may be utilized with good results include woven polyester filaments, needle punched polyester fabric available from Hoestch Celanese Company of North Carolina, fiberglass such as 24 ounce fiberglass roving sold commercially under the trade name ROVCLOTH, polypropylene filaments sold commercially under the trade name MARIFI 500X, polyethylene fabric such as that available from Nicolon Corp. of Norcross, Ga. under product code HS-1150, carbon fiber/fabric, and polyamide fabric such as that sold under the trade name KEVLAR. The fiberglass product is presently preferred in forming the base sheet 12.

Once the base layer 18 has cured, the resultant composite base sheet 12 may be peeled free of the support member 12 and inner frame wall 20. One or more hand holds 26 may then be provided in the base sheet 12 by cutting holes into the base sheet 12 at selected spaced locations along its perimetrical edge 14 into which metal eyelets or grommets 28 are installed in any convenient manner.

The eyelets 28 may be sufficiently large (e.g., 2½ inches I.D.) to enable a person who wishes to move the containment to grip the eyelets with one or more of his fingers.

The next step in constructing the containment 10 is to position the containment wall 16 on the base sheet 12. The preferred material for the wall 16 is a PVC/nitrile rubber blend closed-cell foam product sold commercially under the trade name ENSOLITE. This material has a 100% (or nearly 100%) elastic memory that enables the material to return quickly and fully to original shape after it has been deformed, even after being subjected to repeated deformation/recovery cycles over the expected life of the containment wall 16. The closed-cell structure of this material also makes it resistent to liquid absorption or passage in the event that the wall 16 is punctured or torn during use and is exposed to the containment liquid. Such damage to the containment wall is repaired easily by bonding the torn sections back together with a small quantity of the base layer material described above and overlaying the repaired portions with a coating of the polymer. The preferred closed-cell foam material has a tensile strength of about 30 pounds per square inch, an elastic elongation of about 150%, and exhibits good chemical resistance, particularly to hydrocarbon products such as gasoline and other petroleum fuels.

Figure 4:
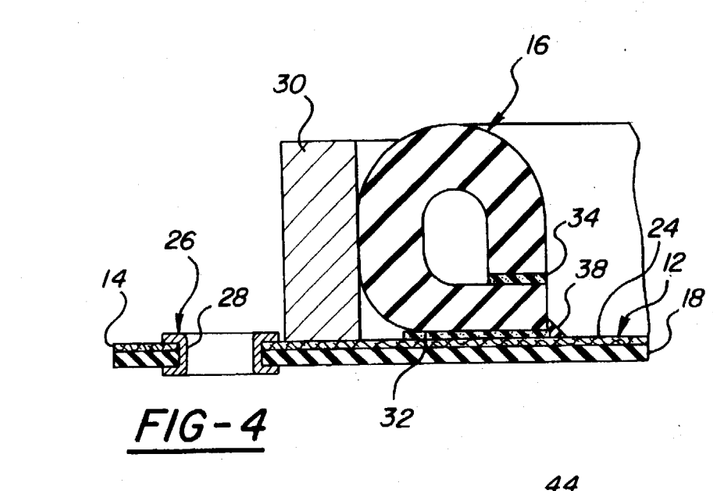
FIG. 4 is a fragmentary sectional elevational view illustrating the intermediate step of forming the upstanding tubular perimetrical containment wall in a second jig following removal of the first jig.

As mentioned, the containment wall is tubular and the closed-cell foam material could be extruded in the tubular configuration shown, but a commercial source for such a product is not known to be available at present. The tubular construction can be made, however, from sheet stock using the method according to this invention that is illustrated in FIG. 4. The sheet stock may be available only in lengths (e.g., 7 feet) that are shorter than the total required perimetrical length of the final containment wall 16, so that the wall may have to be built in sections. The present method involves providing a second rigid frame 30 that is similar in shape to that of the first frame 20, but relatively smaller in size by an amount sufficient to enable the frame 30 to be positioned on the base sheet 12 at a location inset from the perimetrical edge 14 of the base sheet and the handholds 26, as shown in FIG. 4. A tack coat 34 of the base layer material is applied one section at a time to the base sheet 12 inboard of the frame 30 as shown. Before each section of tack coat 32 cures, the associated section of foam sheet stock is placed on the tack coat 32 and folded over upon itself to assume the tubular shape shown in FIG. 4, with the adjoining surfaces of the sheet stock being secured by another tack coat 35 of the same base layer material. Subsequent wall sections may be constructed in the same way and positioned in end-to-end abutting engagement, with their adjacent end wall sections secured by additional tack coat joints 36, as illustrated in phantom in FIG. 1. Also, as shown in FIG. 1, it is preferred that the butt joints 36 not fall at the corners of the containment wall 16, but rather somewhere in between. During construction of the wall 16, the frame 20 serves to position and restrain the wall 16 against outward bowing as the various tack coats cure. A continuous tack coat bead 38 may be applied along the inside perimeter of the wall 16 where it meets the base sheet 12 to further secure the wall 16 in position on the base sheet 12. After the tack coat 38 cures, the frame 30 may be removed and the wall 16 will remain in fabricated position.

Figure 5:
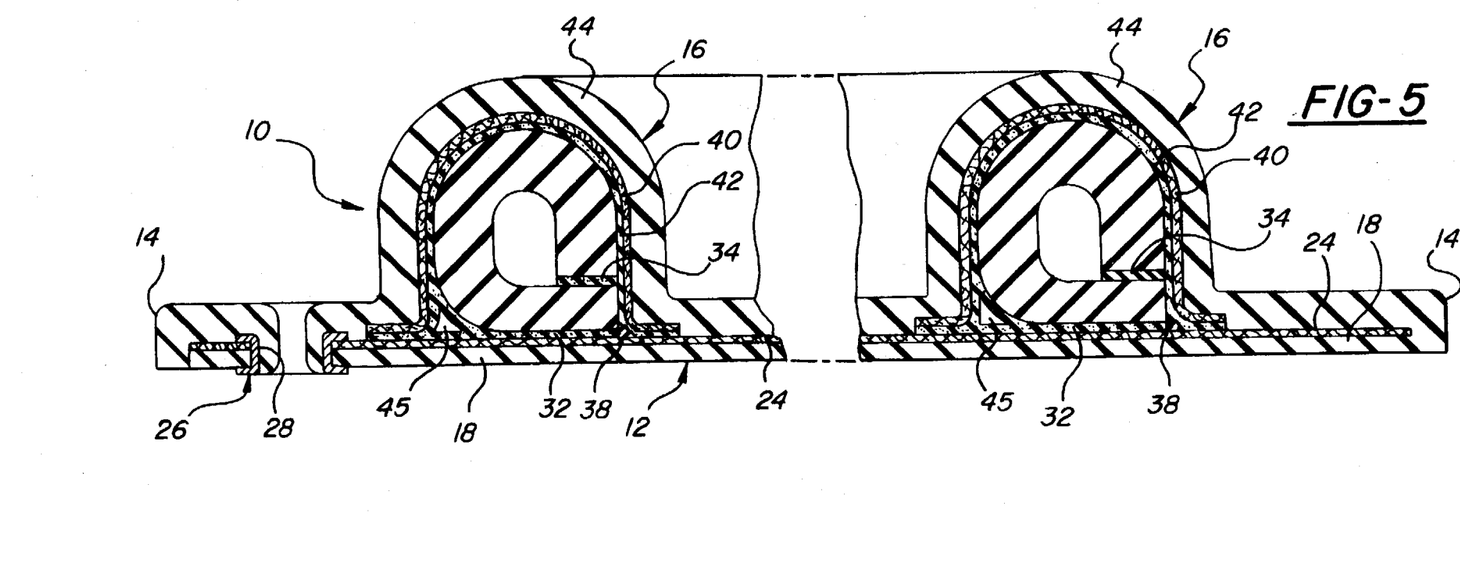
FIG. 5 is a fragmentary elevational section view taken on the line 5—5 of FIG. 1.
Figure 6:
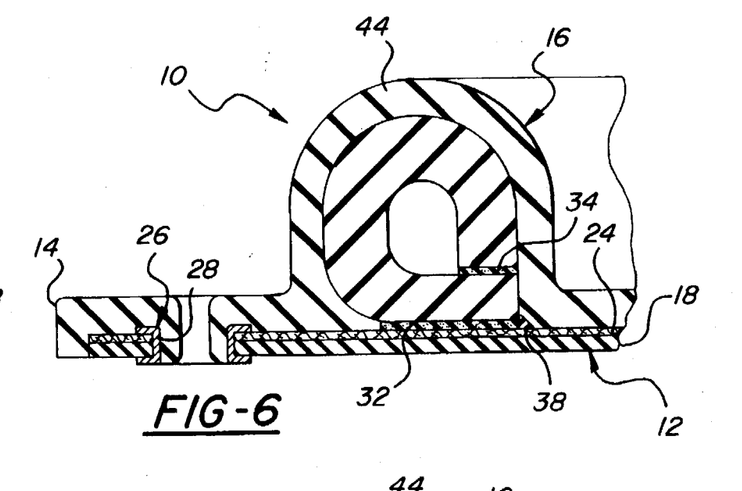
FIG. 6 is a fragmentary sectional elevational view illustrating a second embodiment of the invention.

FIGS. 5 and 6 illustrate two alternative methods and their resultant structures for completing construction of the containment 10. As shown in the embodiment disclosed in FIG. 5, an additional web of woven reinforcing fabric material 40 is positioned to cover the containment wall 16 and extend over along the base sheet 12 a short distance on either side of the wall 16. It may be secured and positioned by a tack coat layer 42 of the aforementioned base layer material.

The final topcoat of the same polymer material may then be applied, preferably by spraying, over the entire upper exposed surface of the base sheet 12 and containment wall 16 to a minimum thickness of about 60–75 mils and allowed to cure to thereby produce a continuous, monolithic, seamless top skin membrane 44 that extends from the base sheet containment area A up and around the containment wall 16 to the edge 14 of the base sheet 12 to provide a tough, wear-resistent, liquid-impervious cover that unites the base sheet 12 and containment wall 16 and contains any liquids that may be spilled within the containment area A.

An alternative method of completing the containment 10 and its resulting structure is illustrated in FIG. 6 and is the same as that described in the preceding paragraph, except that the fabric layer 40 and its associated tack coating layer 42 are omitted. However, the same top skin membrane 44 as described above is applied directly to the containment wall 16 and base sheet 12 to provide the same type of cover.

The resultant containment 10 is a portable, self-contained unit that may be dragged, carried, or otherwise transported from one location to another and positioned in an area where liquid to be contained is being handled without requiring modification of the existing area, such as the erection of stationary dike walls as in the installation of permanent liquid spill containments.

An example of a use for the portable containment 10 is at gasoline service stations where it can be positioned in the area where the fuel delivery trucks normally park when filling the underground storage tanks with fuel from the truck. In such an application, the size of the containment 10 would be selected to accommodate preferably the entire liquid-containing tank of the vehicle within the confinement area A. The containment 10 is positioned in the proper area before the truck arrives and the truck is permitted to enter the containment area A by simply driving up and over the containment wall 16. The vehicle wheels, when rolling over the containment wall 16, apply both vertical and lateral compressive loads to the wall 16. The portions of the tubular containment wall 16 engaged by the vehicle wheels yield under the applied load and are substantially flattened so that they are compressed vertically and displaced laterally by the wheels. This lateral displacement is rendered possible because the wall 16 is tubular in configuration. It is further aided by the presence of the exterior space or pocket 45 which is provided perimetrically along the base of the wall 16. The elastic closed-cell character of the containment wall 16 enables the deformed portions of the wall 16 to recover quickly and fully after each of repeated deformations without breaking down or taking a permanent set. The elastic character of the cover layer 44 also allows it to flex under the load of the vehicle wheels and recover its shape after each of repeated deformations. When positioned in the containment area A, any spillage of liquid from the truck will be contained within the confines of the wall 16 and may be cleaned up such as by pumping the liquid out of the containment. To preclude the possibility of fluid escapement past flattened regions of the wall 16, the truck will not be driven up over the wall 16 to exit the containment area until any spilled liquid has been removed.

Another anticipated use for the portable containment unit 10 is at airports where the containment 10 is sufficiently sized to accommodate the mobile refueling truck typically used to refuel planes within the containment area A, as well as all or part of the plane itself. As with the service station example above, the refueling truck and possibly the plane may enter and exit the containment area A simply by driving up and over the containment wall 16. Any fuel spillage will be contained within the containment area A and will be cleaned up in the same manner before permitting the vehicle to exit the containment area. The portable containment 10 may, of course, be used in other applications as well, where liquid to be contained is being handled, and the particular size and shape of the containment 10 will depend on the specific application.

According to another aspect of the invention, a retractable sump, generally indicated at 46, may be incorporated into the construction of either embodiment of the containment described for pooling and holding the remnant of any spilled liquid to facilitate complete clean-up and removal. The sump 46 incorporates a tubular sleeve-like member 48 having an open upper end 50 that is mounted within an opening 52 formed in the base sheet 12 within the confinement area A. The sleeve 48 is closed at its opposite lower end by a rigid or semi-rigid end plate 54 in a manner to define a fluid-tight, sump well 56 which projects below the level of the base sheet 12. The sump may be generally cylindrical in shape with a diameter and height of about 12 inches. The end plate 54 may be fabricated from a rigid PVC plastic material and the sleeve 48 may comprise a flexible, liquid-impermeable PVC sleeve reinforced by an embedded helical metal coil 58 which supports the sleeve radially while permitting the sleeve 48 to expand and contract lengthwisely without stretching. A handle 59 is secured by screws 60 to the end plate 54 within the well 56 to enable the user bodily to contract the sleeve from an extended condition, shown in full lines in FIG. 7, to a relatively shorter length collapsed condition, shown in chain lines in FIG. 7. The final top coat layer 44 extends into the interior of the sump sleeve 48 as at 62 to thereby integrate the sump 46 with the base sheet 12 to maintain the seamless, liquid-impervious continuity of the top coat 44 between the base sheet 12 and sump 46 and thereby render the sump fluid tight. An outer layer 64 of the same polymer material is also applied to the exterior surface of the sleeve 48 and end plate 54 to enhance the fluid-tightness, toughness, and durability of the sump 46.

Figure 7:
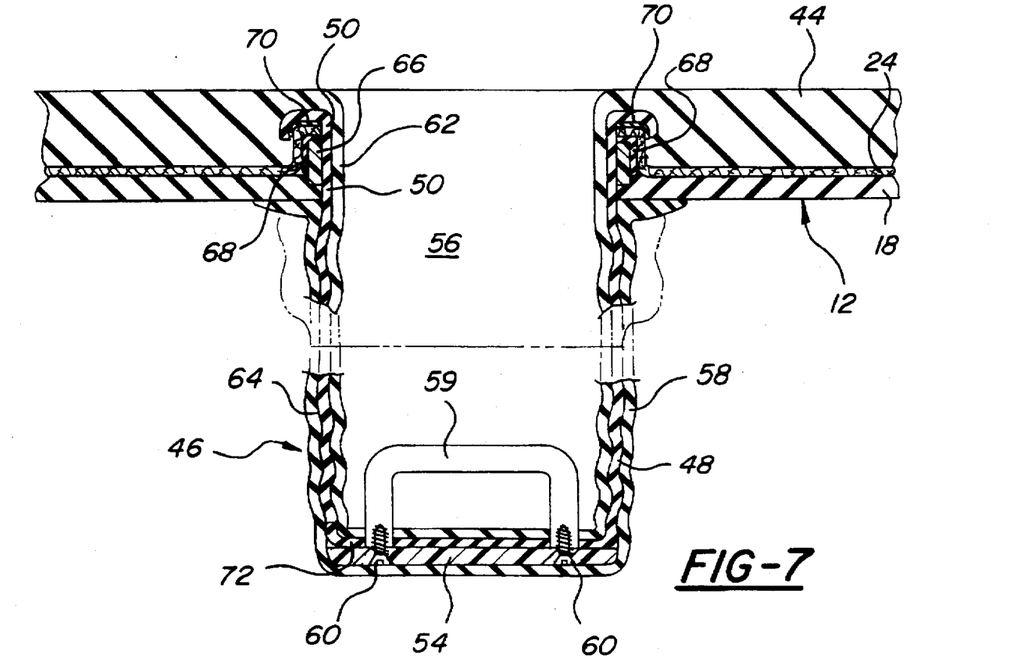
FIG. 7 is an enlarged fragmentary sectional elevational view illustrating the construction and installment of the sump.

Incorporated into the construction of the sump 46 is a rigid template ring 66 that is embedded in the base sheet 12 between the base layer 18 and fabric 24 and which encircles the base sheet opening 52 to provide the opening with a reinforced lip. The ring may be fabricated of PVC plastic and has a thickness that enables it to be embedded in the base sheet 12 without causing any appreciable increase in overall thickness of the base sheet 12 in the vicinity of the sump 46.

The installation of the sump 46 occurs in part during the making of the base sheet 12 wherein prior to the base layer 18 curing, the template ring 66 is positioned on the base layer 18 where the opening 52 is to be formed for the sump. The ring 66 is embedded into the base layer material as shown and sprayed with a tack coating 68 of the base layer material after which the fabric 24 is laid onto the base layer 18 covering the ring and the base layer material is allowed to cure as before. At some point prior to the application of the final top coat 44, the opening 52 is cut into the base sheet 12, using the inner perimeter of the ring 66 as a guide. Another tack coat 70 is then applied to the fabric 24 around the opening 52 and the open end of the sleeve 48 is extended through the opening 52 from below and draped over the fabric cover ring onto the tack coat 70. The draping of the sleeve material may be facilitated by cutting a plurality of circumferentially spaced longitudinal slits into the upper end of the sleeve 48. The end plate 54 will have been secured to the lower end of the sleeve 48 before its attachment to the base sheet 12 by means of a tack coat layer 72 of the same base layer material. Also, the handle 58 will have been attached to the end plate 54 by means of the screws 60 prior to securing the sleeve 48 to the base sheet 12. Once mounted, the outer layer 64 of the base layer material is applied to the exterior surface of the sleeve 48 and end plate 54 and feathered into the base layer 18, as illustrated in FIG. 7. Finally, the top coat 44 is applied as before, except that the thickness of the top coat material is decreased in the vicinity of the ring to maintain the generally uniform thickness of the base sheet 12, and some of the top coat material 62 is sprayed into the interior of the sump to coat the inside surface of the sleeve 48 to thereby unify the sump 46 and the base sheet 12.

A containment having such a sump 46 may be used in much the same way as that described previously, except that, prior to placement of the containment in an area where liquids to be contained are being handled, a recess or hole will be dug to accommodate the sump 46 and allow it to extend below the level of the base sheet 12. When liquid is spilled within the containment area A, the attendant may clean up the spill by guiding the liquid into the sump well 56 with a squeegee or other device to concentrate and hold the liquid in one localized region. A conventional immersible-type pump may be introduced into the sump well 56 to pump out the liquid to another suitable containment, prior to the vehicle exiting the containment area A.

To relocate the containment, the attendant may withdraw the sump from the hole in which it was accommodated by grasping the handle 58 and pulling it upwardly to collapse the sleeve 48. The containment may then be transported as before to another selected containment site.

An alternative method of producing a liquid spill containment 80 of the same general construction as those previously described is illustrated in FIGS. 8–13. Like the previously described containment device, the containment device, shown completed but in inverted positions in FIG. 13, includes a perimetrically endless containment wall generally indicated at 82 fabricated of the same closed cell foam material as that described previously, which exhibits the same properties. The endless containment wall 82 is constructed to have a predetermined circumferential shape and size to enclose within its interior boundary a liquid spill containment area or surface A' that is of a suitable size and shape for the particular application for which it is to be used. For example, the containment wall may be arranged in a rectangular, square, circular, or any of a number of configurations suitable for the particular application.

Figure 8:
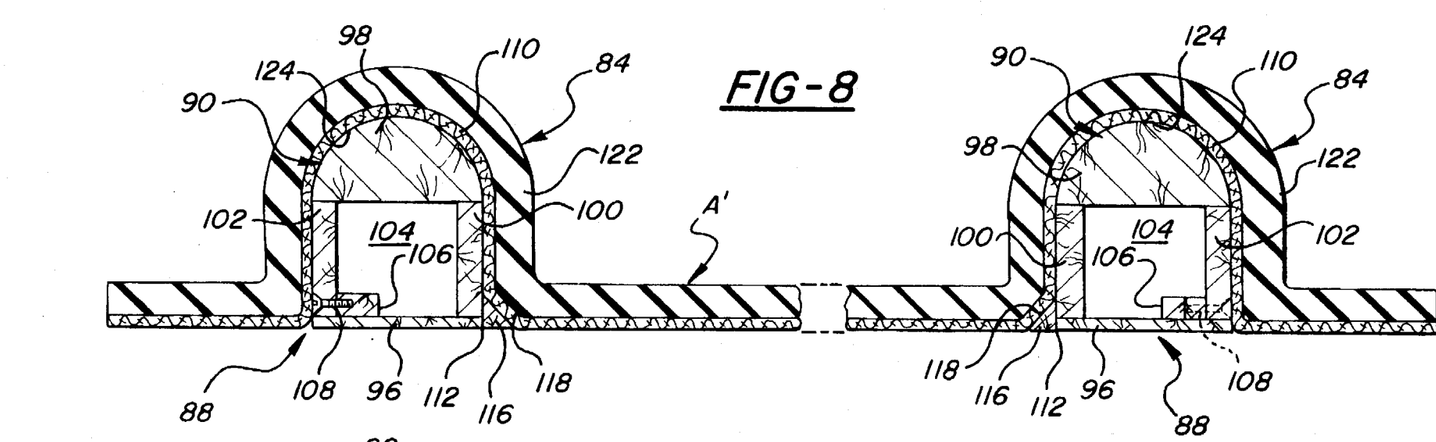
FIG. 8 is a fragmentary sectional elevational view illustrating the initial steps forming the liquid-impervious top layer, according to a further alternative method.

The containment wall 82 is likewise encapsulated between two liquid-impervious, pliable top and bottom membranes 84, 86. FIG. 8 illustrates the preferred alternative method according to this invention for producing the top membrane 84 utilizing a form 88 shown in FIGS. 8–11.

Figure 9:
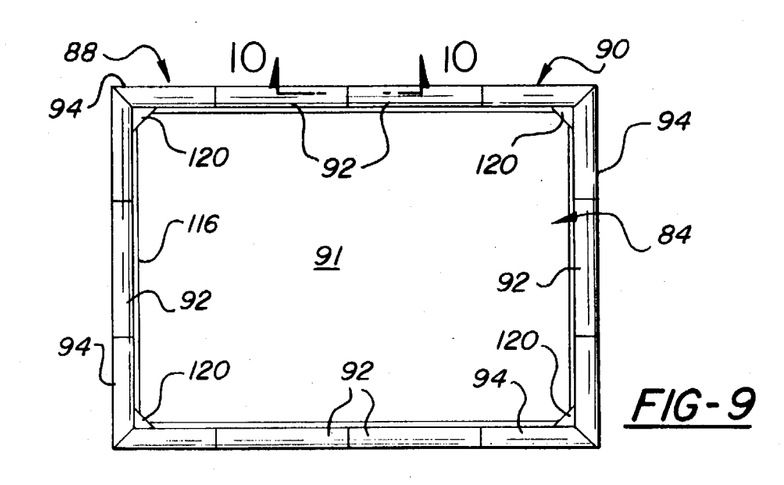
FIG. 9 is a plan view of the form used in performing the initial steps of the further alternative method.

The form 88 includes an upstanding, endless curb generally designated 90 that encloses an open recessed area 91 within its confines corresponding generally in dimensional size and shape to that of the liquid spill containment area A' to be produced. The surface of the curb 90 is constructed to have the same general shape as the containment wall 82 to be produced. The form 88 may be constructed as a modular device from a selected number of individual modular units or segments of various shapes and sizes, each having a curb-defining portion that enables the user to select and arrange a selected combination of the modular units in end-to-end abutting relation to one another to produce the form 88 with the appropriate size and configuration suitable for the particular containment device to be produced. FIG. 9, for example, illustrates one such arrangement in which a series of linear 92 and right-angled corner 94 modular units have been selected and arranged to provide the form 88 with a rectangular configuration of a particular size. It will be appreciated that various other combinations could be employed, and it may be necessary to arrange the modular unit in another manner and perhaps provide modular units having a different shape than those shown, such as a curved modular unit, for example.

As shown in FIG. 8, the form 88 may be conveniently fabricated of wood or other suitable material to include a base plate 96, a curvilinear cap 98 and a pair of spaced apart inner and outer side wall extenders 100 and 102 that are generally parallel to one another and extend perpendicularly upwardly from the base plate 96 to interconnect the base plate 96 and cap 98. As a result of this box-like construction, each of the modular units is open in the center to provide a cavity 104 that extends along the length of each unit and is open to each of its ends.

Figure 10:
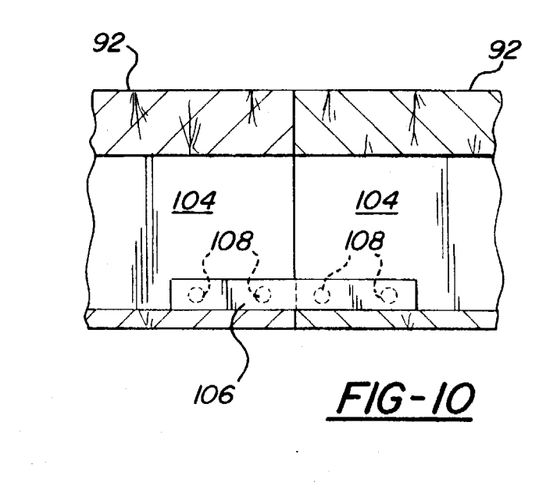
FIG. 10 is a fragmentary cross-sectional view taken on the line 10—10 of FIG. 9.

Once the modular units are selected, they may be positioned and joined to one another preferably by means of a strap 106 that is arranged within the adjoining cavities of each adjacent pair of modular units, as illustrated in FIG. 10, and is secured to each unit preferably by screws or other suitable fasteners that permit the units to be disconnected, if need be, for use in other applications. It will be appreciated that the strap 106 will be appropriately shaped to fit the adjoining modular units and that one may be provided at each joint between adjacent modular units. The straps 106 may be formed of wood and may extend equally into the adjoining cavities 104 of the adjacent modular units, as illustrated in FIG. 10. In practice, it is preferred that a strap 106 be secured to one of the modular units (e.g., the right hand unit in FIG. 10) before that unit is joined to its adjacent modular unit (e.g., the left hand unit in FIG. 10). As the units are brought together, the free unattached end of the strap 106 is extended into the cavity 104 of the adjacent modular unit and thereafter releasably secured to the adjacent module by the screws 108.

Once the form 88 is constructed, a sheet of pliable reinforcement fabric 110 is laid over the form such that the fabric 110 covers the recessed area 91 and extends up and around the curb 90, as shown in FIG. 8. It is preferred that the fabric 110 be draped on a form in such manner as to minimize any gathering or bunching of the fabric. Areas that are susceptible to bunching include the inside corners of transition 112 formed between the inner side wall extender 100 and the floor, and the inside corners 114 of the corner modules 94. To minimize gathering or bunching of the fabric in these areas, the form 88 is provided with a transition board or strip 116 that extends and is secured along the inner periphery of the form 88 at the bottom of the inner sidewall extender 100, thus providing a beveled surface 118 that extends at about a 45° included angle from the inner sidewall extender 100 to the floor and serves to support the fabric 110 in transition. At the corners, corner bridging plates 120 are fitted and secured in the corners 114 (FIG. 11) of the corner modules 94 and extend at an angle to the floor, and to surfaces 118, to support the fabric 110 in transition at the corners.

After the fabric 110 has been draped over the form 88 and manipulated to remove or minimize any bunching, wrinkling, folding, or other irregularities in the fabric, a top layer 122 of the aforementioned, fast curing, elastomeric, polymer compound is applied in a flowable state (preferably by spraying) to the exposed top side of the fabric 110 and allowed to cure to produce the seamless, liquid-impervious, reinforced top membrane 84 that lines the containment area A' and extends up and around the containment wall 82, such that the top membrane 84 is formed to the shape of the form 88 and includes a membrane recessed portion or surface and a membrane curb portion with an endless channel impression 124 produced by the curb 90 that is open to a bottom side of the membrane 84; i.e., the membrane cure portion is channel shaped with an open bottom side. The material may also be in a more viscous, than sprayable, state and applied by brushing or troweling. The top layer 122 has no seams, folds, or other irregularities in its surface. The reinforcement of the top layer 122 with the fabric 110, serves to increase the relative rigidity of the top layer 122 sufficiently to render the membrane 88 substantially self-supporting in the sense of retaining its shape.

Once the top layer material 122 has cured, the membrane 84 may be removed from the form 88, inverted, and then supported on a jig 126 (see FIG. 12) having a generally flat, elevated upper surface 128 that engages and supports the top membrane 84 on either side of the channel impression 124. The jig provides a continuous opening or recess 130 in which the channel impression 124 is received and suspended above the floor. Supporting the top membrane 84 in this manner assures the retention of the shape of the membrane 84 and particularly the formed channel 124.

Figure 12:
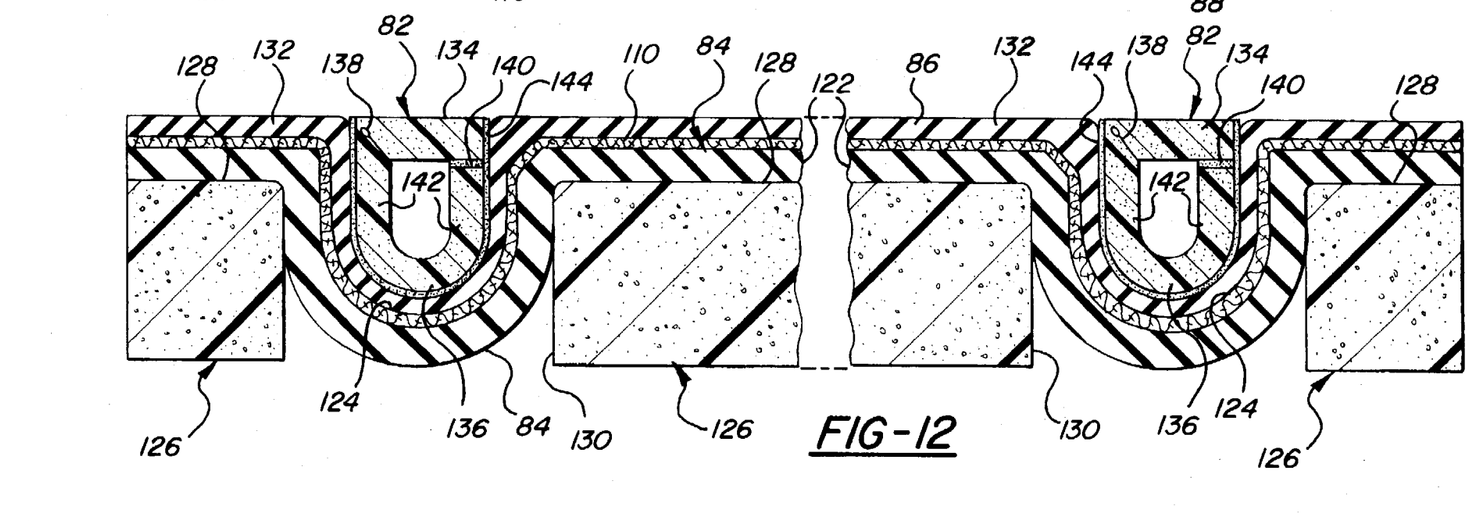
FIG. 12 is a fragmentary elevational sectional view illustrating intermediate steps in the making of the spill containment according to the further alternative method.

Once the membrane 84 is supported in the jig 126, an intermediate layer 132 of the same elastomeric polymer compound material may be applied by spraying it or spreading it on the now-exposed bottom side of the fabric 110 in order to line the inside of the channel impression 124 with the elastomeric polymer compound material before installation of the containment wall 82 (see FIG. 12). As previously, when the coating 132 cures, it bonds or unites with the layer 84 to form an integrated monolithic body.

Figure 13:
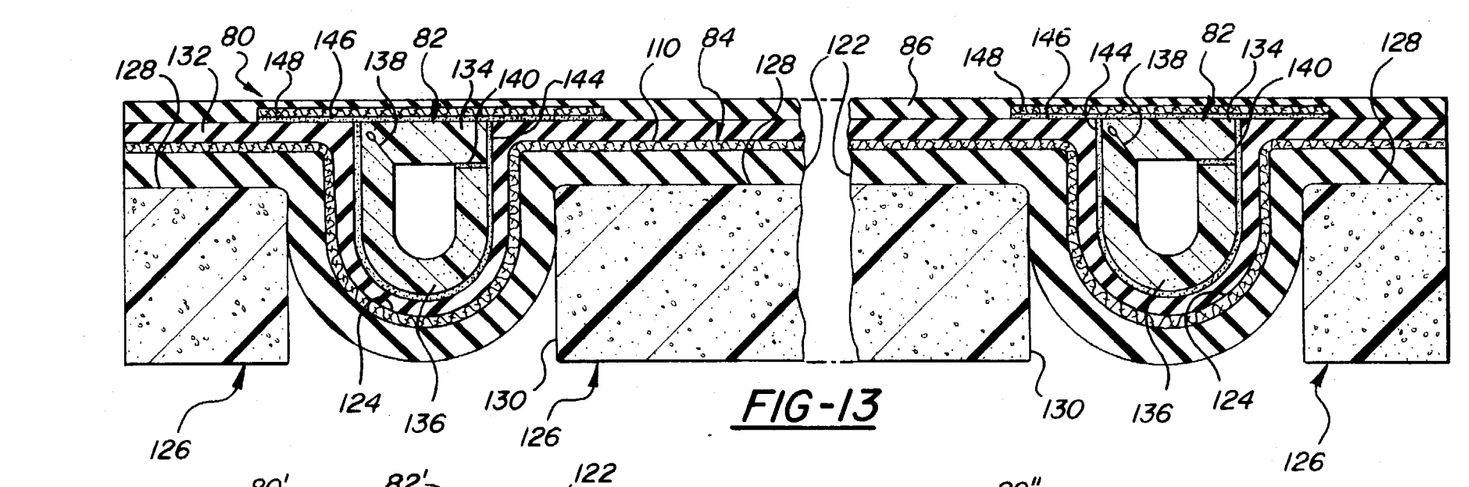
FIG. 13 is a view like FIG. 12, but showing additional steps in the making of the spill containment and its resultant structure according to the further alternative method.

In the embodiment shown in FIGS. 12 and 13, the containment wall 82 is constructed from the same closed-cell foam sheet stock material as that described previously in connection with FIG. 4, and has a tubular, hollow-core construction with a generally D-shaped cross section. This particular containment wall 82 has a flat portion 134 and an adjoining U-shaped curved portion 136. The foam sheet wall material 82 is, prior to being folded to shape, formed or provided with a V-notch 138 at the location of the eventual transition fold defining the flat portion 134 and the U-shaped portion 136. The flexible sheet 82 folds readily without bunching at the V-notch 138, as shown in FIGS. 12 and 13. The portion 136, is thereafter configured, after which the free end of the portion 136 is positioned and adhered to the top of the flat portion 134 at joint 140 by a suitable adhesive, or with a tack coat of the polymer material. Constructing the containment wall 82 in this manner provides the U-shaped portion 136 with legs 142 that are generally straight, parallel to one another, and extended perpendicularly to the flat portion 134.

The containment wall 82 may be constructed in sections, as described above, that are each shorter than the total required perimetrical length of the final containment wall 82. Once constructed, the containment wall 82 is installed into the channel impression 124, as shown in FIG. 12. A perimetrically continuous tack coat 144 of the elastomeric polymer compound may be applied to the intermediate layer 132 just prior to the installation of the containment wall 82, after which the tack coat 144 will be permitted to cure in order to bond or secure to the layer 132 and the containment wall 82 within the channel 124.

After the containment wall 82 has been installed in the channel 124, the channel 124 may be closed and the containment wall 82 encapsulated, in the manner illustrated in FIG. 3, by first applying a tack coat 146 of the elastomeric polymer compound to the exposed bottom side of the containment wall 82 and to the regions of the intermediate layer 132 adjacent the channel 124. A reinforcement layer of reinforcement fabric 148 may then be applied to the tack coat 146 which bonds to the fabric 148, the layer 132, and the wall 134 and the final base layer 86 of elastomeric polymer compound may then be applied to the entire exposed bottom surface after which it is allowed to cure which results in bonding it to and integrating it with the top membrane 84 via the intermediate layer 132. The resultant spill containment 80 may then be removed from the jig 126 and turned right-side-up for use.

Figure 15:
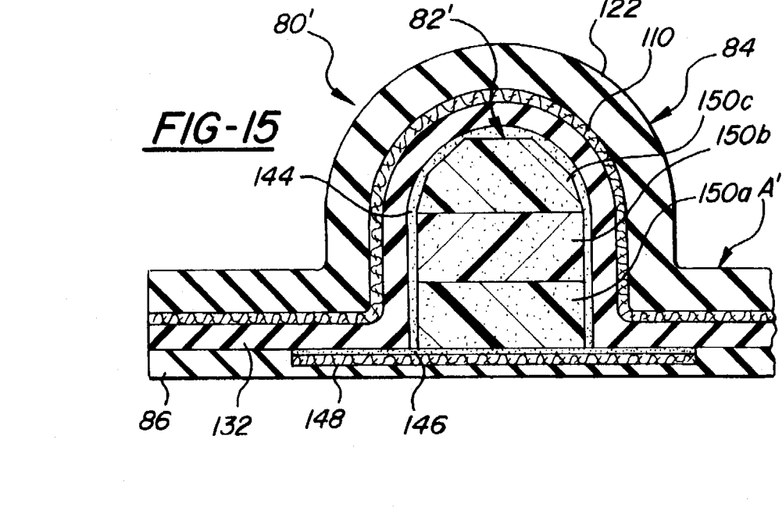
FIG. 15 is a fragmentary elevational section view illustrating another spill containment device which utilizes a solid core foam containment wall.
Figure 16:
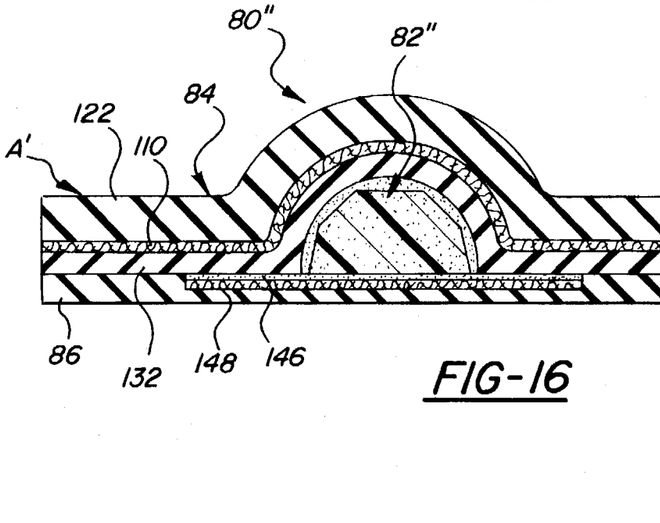
FIG. 16 is a fragmentary elevational sectional view illustrating still a further embodiment of the spill containment, similar in construction to that of FIG. 15, but with a shorter containment wall.

FIGS. 15 and 16 illustrate two alternative containment structures which are identical in construction to the embodiment shown in FIG. 13 and made following the same process, except that, instead of a hollow, tubular containment wall, the devices of FIGS. 15 and 16 have solid core containment walls fabricated of the same closed cell material described previously. Because of their similar constructions, the features of the devices of FIGS. 15 and 16 will be referenced by the same reference numerals as those used to reference the same or equivalent features of the device 80 of FIGS. 8, 12 and 13, except that the containment walls of FIGS. 15 and 16 will be referenced generally by the primed reference numerals 82' and 82", respectively.

Because of the ready availability of closed-cell foam in sheet form, the solid containment wall 82' may be conveniently constructed by stacking multiple sheets upon one another to attain a desired height of the containment wall. As illustrated in FIG. 15, three such sheets, 150a, 150b, and 150c are stacked upon one another to provide a containment wall having the same general outline as that of the wall shown in FIG. 13. The uppermost sheet 150c has, however, been chamfered to provide the top of the containment wall 82' with a generally rounded configuration. The stacked sheets may be adhered to one another using the same adhesive or tack coat as that used at the joint 140 of the containment wall 82.

The containment wall 82" of FIG. 16 is identical to that shown in FIG. 15, except that it is not as tall. In the case of FIG. 16, only one thickness of foam sheet is needed, so no stacking is necessary. The cross-sectional shape of the containment wall of 82' of FIG. 16 may correspond to that of the top sheet 150c of FIG. 15.

Figures 11, 14:
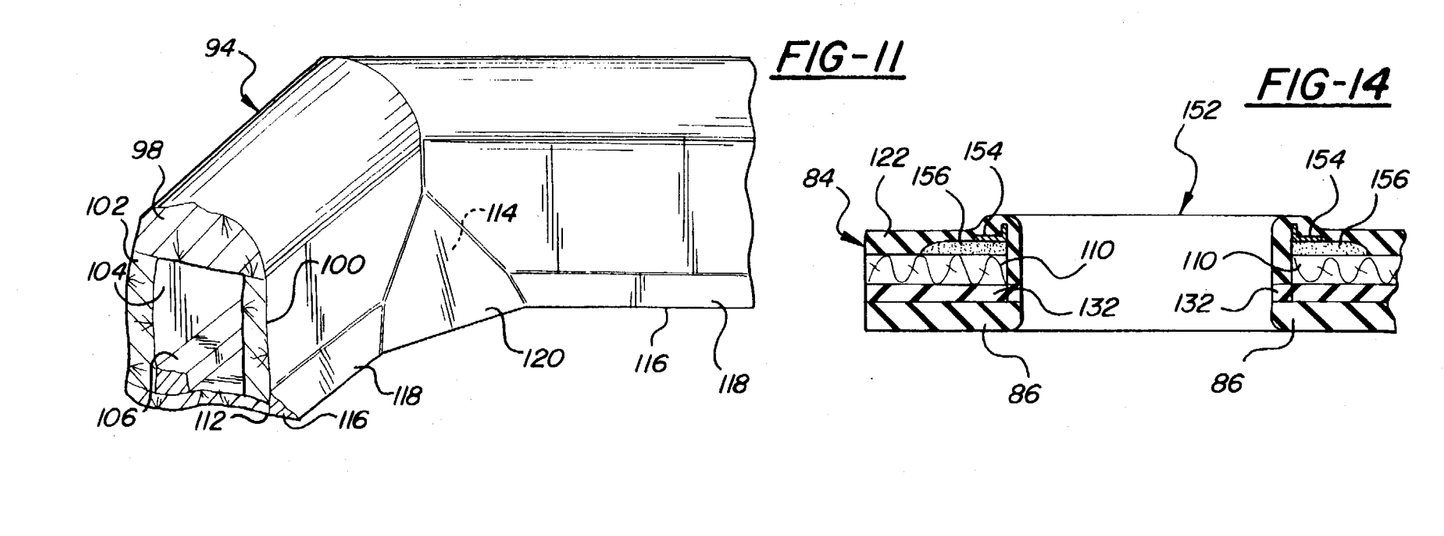
FIG. 11 is an enlarged fragmentary perspective view of the corner module shown in FIG. 9 showing certain features of its construction.
FIG. 14 is an enlarged fragmentary sectional view showing the installation and resultant construction of a hand hold that may be incorporated into the containment devices.

FIG. 14 illustrates an alternative hand-hold construction that may be utilized on any of the aforementioned spill containment devices. The hand hold 152 includes a rubber grommet or template 154 that is adhered to the reinforcement fabric 110 by a tack coat 156 of the elastomeric polymer compound material prior to or after the fabric 110 has been draped onto the form 88. The template 154 may have a circular, oblong, or other configuration of suitable shape and size for gripping. Once the template 154 has been adhered to the fabric 110, the fabric material encircled by the template 154 may be cut out, after which the device 80 may be completed in the manner previously described.

The alternative containments 80, 80', and 80" may also incorporate a sump of the same type previously described which is used in the same manner.

Figure 17:
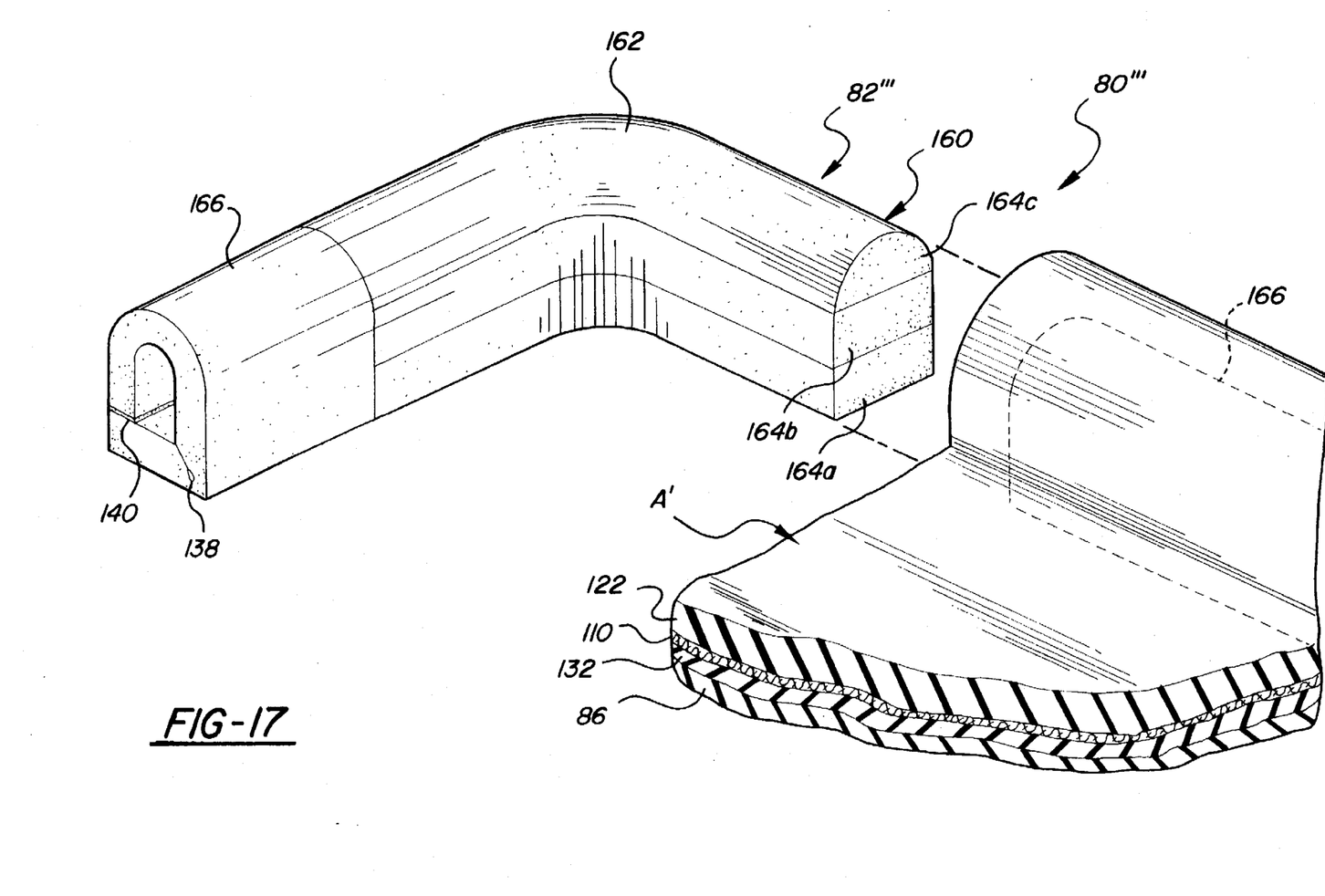
FIG. 17 is a fragmentary perspective plan view, shown partly broken away, of a containment construction having a pre-shaped alternative corner.

FIG. 17 illustrates still another embodiment of a spill containment 80'" which is manufactured according to the same process as that described above for the containment 80. The containment 80'" is of the same general construction as the containment 80, except that the containment wall 82'" has four corner sections 160 (only one being shown) that have a solid core construction and are fabricated out of the same closed cell foam material. The corner sections 160 extend continuously between opposite ends and are preformed to include a 90° bend or elbow 162 between the ends, which serves to eliminate any kinking or folding of the containment wall material that may occur as a result of converting a straight section to a 90° elbow. The corner sections 160 preferably have a gradually rounded or radiused transition at the elbow 162 rather than an abrupt, sharp 90° bend. The rounded corners and the uninterrupted, continuous unitary extension of the material between its ends tend to reduce stress at the corners of the containment 80'".

Although it is contemplated that the solid core corner sections 160 may be formed from a single piece of closed cell foam material having the dimensions suited for the particular application, it is preferred that the sections 160 be constructed by stacking multiple sheets upon one another in the same general manner as described above for forming the containment wall 82'. As illustrated in FIG. 17, multiple sheets of relatively thinner foam stock (e.g., 2 inches thick) 164a, 164b, and 164c may be stacked one upon the other to attain the desired height of the wall 82'" and adhered together at their interfaces by the same adhesive or tack coat used at the joint 140 of the containment wall 82. The individual sheet portions 164a, 164b, and 164c each have the preformed elbow shape and may be conveniently produced by die cutting the elbow-shaped sheet portions 164a, 164b, 164c from larger sheets of the closed cell foam material. The corner of sections 160 of this embodiment may be interconnected by intermediate linear sections 166 of the same solid-core, stacked construction as the corner sections 160 or, as shown in FIG. 17, may have the tubular construction described previously with respect to the containment wall 82.

Apart from the alternative construction of the containment wall 82'", the remaining construction and process of producing the containment 80'" is the same as that described for the containment 80. Accordingly, the same reference numerals are used to designate like features. This latter embodiment 80'" may also include hand holds and the sump of the types previously described.

To form the sump in a containment in upright position made according to FIGS. 8-17, a sump opening needs first to cut through the layers 122, 132 and 86 and fabric 110. The ring 66, which has an increased height to extend to the level of the upper surface of layers 122, can then be inserted and bonded in place using the same polymer material. The sump can then be fabricated in the manner previously disclosed except that the polymer coat applied over fabric 58 to unite it to layer 122 upon its curing is thicker and the fabric 50 is both internally and externally sprayed with a coating of polymer prior to installing it. The coating applied to unite the polymer coated sleeve 48 with the layer 86 may be applied as a final step once the sump is otherwise bonded as an integral part of the structure.

Figure 18:
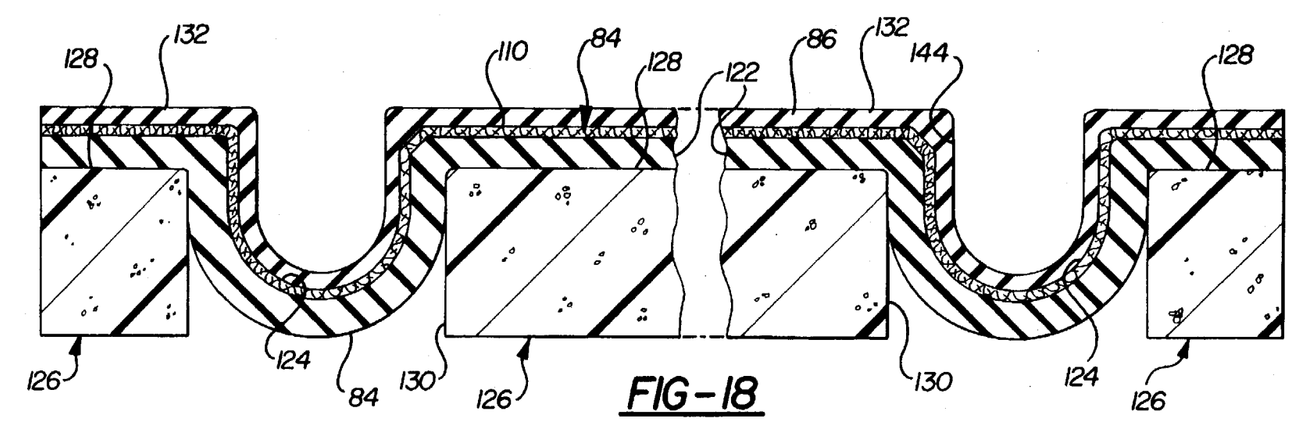
FIG. 18 is a fragmentary elevational sectional view illustrating a still further alternative method of making a liquid containment.
Figure 19:
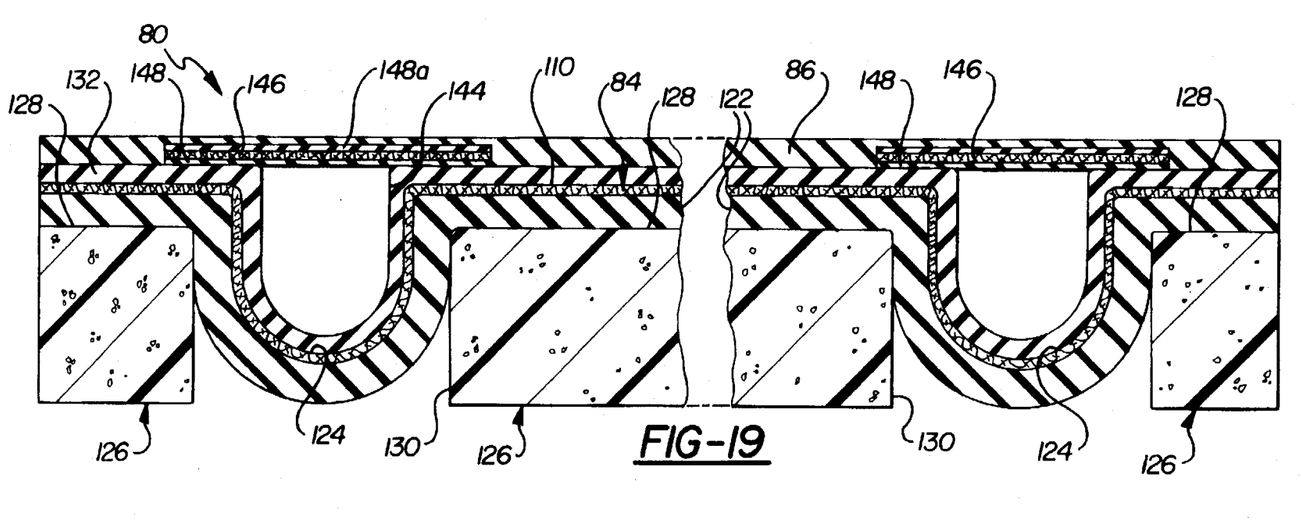
FIG. 19 is a similar view illustrating a final step in this alternative method and the product formed.

FIGS. 18 and 19 illustrate a still further alternate method of making a modified containment which essentially is the same as the method described with reference to FIGS. 8-13, except that the curb or containment wall 82 is omitted. This product finds use where heavy vehicles are not being repeatedly driven over the perimetral portion of the containment. It is to be understood that the method described with respect to FIGS. 8-11 remains the same. In FIG. 18 the containment portion formed as in FIG. 8 is inverted in position in the same manner as illustrated in FIG. 12. The foam containment 82 is, however, not inserted. The tack coat 146 is only applied to the horizontal surfaces of the layer 132 and, instead of the containment wall cover layer 148 being merely a reinforcement fabric, it is a reinforcement fabric coated with the same liquid elastomeric compound as at 148a, which has been allowed to cure. Layer 148 will cover the entire perimeter of the space formerly occupied by wall 82 and will be bonded in position by the tack coat 146. Then the final base layer 86 is applied as previously.

It is to be understood that the embodiments described are exemplary of various forms of the invention only and that the invention is defined in the appended claims which contemplate various modifications within the spirit and scope of the invention.

We claim:

1. A method of making a portable liquid containment having an upstanding endless curb enclosing a recessed containment surface comprising the steps of:
   a) providing a form having an endless curb enclosing an area of surface which is recessed relative to the curb;
   b) applying a continuous layer of a curable liquid elastomeric polymeric material over the shape of the form an curing the layer to produce a continuous liquid-impervious top membrane having a membrane recessed surface portion surrounded by a membrane curb portion which is channel shaped and has an open bottom side;
   c) removing the top membrane from the form and inverting it;
   d) applying a shielding strip to the open side of the channel-shaped curb portion of the membrane; and
   e) while the top membrane is inverted, applying to the top membrane and shielding strip a continuous layer of a liquid elastomeric polymeric material and curing it to unite it with said top membrane and form a liquid-impervious containment lower membrane covering the said curb portion, and the recessed surface portion of the top membrane.

2. The method of claim 1 wherein said shielding layer includes a strip of reinforcement and cured liquid impervious elastomeric polymer.

3. A method of making a portable liquid containment having an upstanding curb enclosing a recessed containment surface, comprising the steps of:
   a) providing a form having an upstanding endless curb enclosing a recessed surface;
   b) applying over said form and curing a layer of liquid polymeric elastomeric material which assumes the shape of the form to produce a continuous liquid-impervious top membrane extending from the recessed area of the form up and over the form curb to provide a membrane recessed portion surrounded by a membrane curb portion which is open to a bottom side of said top membrane to provide an open channel;
   c) removing said top membrane from the form and inverting it;
   d) inserting within said open channel a containment wall constructed of closed-cell foam material having an elastic memory enabling said wall to deform under an applied compression load and return to original shape after each of repeated deformations of said wall; and, while the membrane is inverted,
   e) applying a shielding strip to cover the open side of the curb portion of said membrane; and
   f) applying to said top membrane and shielding strip a layer of liquid elastomeric polymeric material and curing it to form a liquid-impervious lower membrane and encapsulate the wall between said top and lower elastomeric membranes.

4. A method of making a portable liquid containment having an upstanding curb enclosing a recessed area, comprising the steps of:
   a) providing a form having an endless perimeter curb enclosing a containment surface;
   b) applying a layer of liquid elastomeric polymeric material to the shape of the form and curing it to produce a continuous liquid-impervious top membrane with a bottom side configured to the shape of the form, thereby providing a membrane containment surface portion surrounded by a membrane curb portion which is open to the bottom side of said top membrane to provide an open channel;
   c) applying a shielding strip to cover said open channel; and
   d) applying over said shielding strip and said bottom side of said top membrane a liquid layer of elastomeric polymeric material and curing it to form a liquid-impervious lower membrane united with said top membrane.

* * * * *